UNITED STATES PATENT OFFICE.

GEORGE MICHAEL FISCHER, OF BIGPOOL, MARYLAND, ASSIGNOR OF ONE-HALF TO FRANKLIN JACOB OTTO, OF BALTIMORE, MARYLAND.

METHOD AND COMPOSITION FOR THE TREATMENT OF WOOD.

1,232,909.   Specification of Letters Patent.   Patented July 10, 1917.

No Drawing.   Application filed December 10, 1914.   Serial No. 876,476.

*To all whom it may concern:*

Be it known that I, GEORGE MICHAEL FISCHER, a citizen of the United States, residing at Bigpool, in the county of Washington and State of Maryland, have invented certain new and useful Improvements in a Method and Composition for the Treatment of Wood, of which the following is a specification.

My invention relates to a germicide, fungicide and insecticide, for the treatment of diseases of trees, vines, bushes and other foliage or vegetable and plantiferous growths which diseases originate through the formation of destructive micro organisms or insect pests; and which acts also to preserve and protect such plants against such diseases.

Further my invention relates to a hitherto unknown composition which, besides acting as a germicide and fungicide to produce asepsis, also acts as an efficient preservative for wood and therefore it is particularly adaptable for use in the preservation and prolongation of the life of railroad ties, telegraph poles, wooden piles and all other articles which are constructed of wood and in their various uses are subjected to the deleterious effects of moisture and weather.

Heretofore it has been a common expedient to impregnate wooden articles, such as those above mentioned, with creosote for the purpose of preserving the same by protecting them against the decaying and weathering effects of atmospheric changes. However, it has been found in practice that, while creosote acts as a fairly effective preservative, its practical use is offset in a great measure by reason of the dangers to those who handle the articles thus treated, due to the fact that creosote causes dangerous sores and eruptions upon the hands of those who handle it and articles treated with it.

Also it has been common practice to immerse such articles as wood ties, telegraph poles and the like in a sulfuric acid bath for the purpose of producing a carbon coating upon the exterior which acts to preserve the article thus treated from decay. However, this method also has its defects, firstly, because sulfuric acid is expensive and difficult to handle, and secondly because the carbon coating thus produced does not extend into the core of the article as in methods of preserving in which wood is thoroughly impregnated with the preservative.

A germicide, fungicide, insecticide or preservative, in order to be practical, must be first of all effective, second it must be composed of comparatively inexpensive materials, and thirdly it must be of simple composition.

The novel preparation of the present invention possesses the above advantages, and in addition embodies certain material advantages in composition and consistency which make it particularly valuable and advantageous. This preparation comprises essentially potassium permanganate which, for purposes of use is combined in solution with a thickening or emulsifying agent which masks or retards its action so that the action is more mild and prolonged, and so that after application a hardening agent is formed in and on the material treated. As such thickening agents may be mentioned cold water paint (such as the common organic water soluble paint) or white-wash (slaked lime). The permanganate is advantageously used in dilute solutions such, for example, as one pound in a thousand gallons of water (8,000 pounds), to which is added, for example, one-half bushel of slaked lime (50 pounds). The resulting liquid is similar to white-wash but more dilute. Cold water paint gives a similar composition. Less of the slaked lime or cold water paint can be used, e. g., one peck to one pound of the permanganate and one thousand gallons of water. Less water can also be used where a stronger preparation is desired. In using this preparation it is sprayed on the trees or other objects, or the articles are immersed in it. Potassium permanganate itself sometimes acts too energetically, particularly in strong solutions, but when in very dilute solutions, such as those above referred to, it is a valuable preservative and disinfectant and when combined or masked or thickened its action is still more mild but also more prolonged, and when slaked lime is used, the combination is particularly advantageous.

Moreover, potassium permanganate usually gives a reddish or purplish tint or color when used in strong solutions. Such strength solutions as those above mentioned even cause coloring in many cases. By the use of the thickening agent this action is modified and retarded so that the immediate and more intense action is prevented and the plants and articles protected to a sufficient extent, while the valuable action of the permanganate is nevertheless retained and improved. The tendency toward coloration is avoided or minimized, the result being in appearance more than that of a very dilute white-wash, but with the advantages of the permanganate nevertheless retained and enhanced. Solutions of about one-eightieth of one per cent., such as that above referred to are advantageous, but stronger solutions can be used where a more energetic action is desired.

The novel preparation can also be used as a supplementary treatment of poles which have already been treated with creosote. This treatment very materially increases the durability of the treatment and the life of the treated article. It also protects the hands of the workers from poison, the poisonous nature of the creosote being destroyed or minimized. In this case the use of the permanganate alone in solution is advantageous. The life of wood so treated is materially prolonged.

Particularly for poles and ties that are to be buried in the ground, this treatment with creosote and then with permanganate solution gives a harder and more permanent product. The permanganate is the commercial potassium permanganate, obtainable in either crystal or powder form. With the strength of solution used it is inexpensive as a treating material, and when used in combination with the lime or cold water paint as modifying agents the preparation as a whole is inexpensive. The preparation is used in liquid form after thorough mixing. It is particularly valuable as a spray, destroying fungus growths and acting both as a fungicide and as an insecticide.

When used as a preservative for wood, the wood is preferably impregnated with the liquid in any suitable manner, such as for instance, by immersing the article in the liquid or by forcing the liquid into the capillary tubes of the fibrous structure of the wood under pressure, by means of hydraulic machines such as are used in coloring logs or other wood articles with dye.

When forced into the cellular structures such as wood the cold water paint or whitewash itself also acts as a preservative and coating, even in dilute solutions but the strength of the solution can be increased and the coating and protecting action further increased, the retarding action on the permanganate being correspondingly increased.

I claim:—

A composition of matter for use in spraying trees or plants comprising substantially 16,000 parts by weight of water, one part by weight of potassium permanganate, and 100 parts by weight of slaked lime.

In testimony whereof I affix my signature in presence of two witnesses.

GEORGE MICHAEL FISCHER.

Witnesses:
MALCOLM J. HENESY,
GEORGE I. BREWER.